(12) United States Patent
Song

(10) Patent No.: US 10,996,999 B2
(45) Date of Patent: May 4, 2021

(54) PERSONAL ON-LINE RECORDING MANAGEMENT SYSTEM BY USING NETWORK AND METHOD THEREOF

(71) Applicant: Hye Sun Song, Seongnam-si (KR)

(72) Inventor: Hye Sun Song, Seongnam-si (KR)

( * ) Notice: Subject to any disclaimer, the term of this patent is extended or adjusted under 35 U.S.C. 154(b) by 0 days.

(21) Appl. No.: 15/521,773

(22) PCT Filed: Oct. 27, 2016

(86) PCT No.: PCT/KR2016/012152
§ 371 (c)(1),
(2) Date: Apr. 25, 2017

(87) PCT Pub. No.: WO2017/191876
PCT Pub. Date: Nov. 9, 2017

(65) Prior Publication Data
US 2019/0079809 A1    Mar. 14, 2019

(30) Foreign Application Priority Data

May 3, 2016    (KR) .......................... 10-2016-0054703

(51) Int. Cl.
*G06F 9/54*     (2006.01)
*G06K 9/00*     (2006.01)
(Continued)

(52) U.S. Cl.
CPC ............ *G06F 9/542* (2013.01); *G06F 16/252* (2019.01); *G06F 16/436* (2019.01);
(Continued)

(58) Field of Classification Search
CPC .... G06F 9/542; G06F 16/436; G06F 16/9535; G06F 16/252; G06F 21/32;
(Continued)

(56) References Cited

U.S. PATENT DOCUMENTS 8,180,591 B2 * 5/2012 Yuen .................... A61B 5/0002
702/160
8,810,430 B2 * 8/2014 Proud .................. A61B 5/0002
340/870.03
(Continued)

FOREIGN PATENT DOCUMENTS

KR    10-0784102 B1    12/2007

*Primary Examiner* — Thomas J Dailey
*Assistant Examiner* — Aye M Aung
(74) *Attorney, Agent, or Firm* — LRK Patent Law Firm

(57) ABSTRACT

A personal online recording management system using network includes: user terminal registering ID of user of the personal on-line recording management system in management server, registering iris information in the management server, accessing the network on user terminal, recording voice, converting the voice into text, storing the text, voice, and video information recording daily life to the user terminal and executing an editing process on display unit of the user terminal, transmitting the information to the management server, and displaying the voice, text and video information; a predesignated designator terminal stored beforehand in the management server, displaying the voice, text and video information; a management server storing ID and iris password, managing the voice, text, and video information, and transmitting the voice, text and video information to a predesignated designator terminal; and an internet network or wireless communications network connecting user terminals, designator terminals, and the management server through network.

4 Claims, 4 Drawing Sheets

(51) Int. Cl.
| | |
|---|---|
| *G06F 16/435* | (2019.01) |
| *G10L 15/26* | (2006.01) |
| *G06Q 30/02* | (2012.01) |
| *G06F 16/9535* | (2019.01) |
| *G06F 16/25* | (2019.01) |
| *G06F 21/32* | (2013.01) |
| *G06Q 50/00* | (2012.01) |
| *H04L 12/58* | (2006.01) |

(52) U.S. Cl.
CPC ......... *G06F 16/9535* (2019.01); *G06F 21/32* (2013.01); *G06K 9/00617* (2013.01); *G06Q 30/0201* (2013.01); *G06Q 50/01* (2013.01); *G10L 15/26* (2013.01); *H04L 51/046* (2013.01); *H04L 51/32* (2013.01); *G06K 2009/00738* (2013.01)

(58) Field of Classification Search
CPC .... G06K 9/00617; G06Q 50/00; G06Q 50/01; G10L 15/26; H04L 51/046; H04L 51/32
See application file for complete search history.

(56) References Cited

U.S. PATENT DOCUMENTS

| | | | | |
|---|---|---|---|---|
| 2014/0247136 | A1* | 9/2014 | Proud | G08C 17/02 |
| | | | | 340/870.01 |
| 2016/0063276 | A1* | 3/2016 | Pycock | G06F 21/6245 |
| | | | | 726/28 |
| 2016/0309532 | A1* | 10/2016 | Yu | G06F 3/1454 |
| 2016/0323234 | A1* | 11/2016 | Chen | H04W 4/21 |
| 2016/0337351 | A1* | 11/2016 | Spencer | H04L 63/0876 |
| 2017/0310717 | A1* | 10/2017 | Staples | H04L 65/1093 |
| 2018/0084403 | A1* | 3/2018 | Kode | H04W 8/183 |

\* cited by examiner

PERSONAL ON-LINE RECORDING MANAGEMENT SYSTEM BY USING NETWORK AND METHOD THEREOF

CROSS-REFERENCE TO RELATED APPLICATION(S)

The present application is a U.S. National Phase entry from International Application No. PCT/KR2016/012152, filed Oct. 27, 2016, which claims priority to Korean Patent Application No. 10-2016-0054703, filed May 3, 2016, the disclosure of which is incorporated by reference herein in its entirety.

BACKGROUND OF THE INVENTION

1. Field of the Invention

The present disclosure relates to a system for a real-time transmission of important matters in daily life or major events and social media messages, occurring for each individual, to a server through a network following a verification process; storage and management of the information on the server by individual, day, time, and topic; and provision of the information to individuals after receiving them from the management server through a smart device as needed.

2. Description of Related Art

Background art related to this is described in Korea registered patent no. 10-0784102 (announced 2007 Dec. 10). FIG. 1 is a block diagram of the personal life-management system of the background art. The personal life-management system of FIG. 1 includes a wire-wireless terminal (100), a wire-wireless communications network (110), a personal life-management server (120), and a personal life application server (130). The wire-wireless terminal (100) includes wireless terminals including cellular phone, PCS, PDA, and smartphone, and wired terminals including PC. The wireless terminals are equipped with a web browser capable of accessing the internet, and has an interface capable of using wireless internet. Also, the wire-wireless communications network (110) includes wired/wireless communications networks, and the wireless communications network includes a base station transmitter (BST), a base station controller (BSC), a mobile switching center (MSC), a home location register (HLR), and others (not shown). Also, the wire-wireless communications network (110) includes a CDMA system including 1×EV/DO and 1×EV/DV and a WCDMA system including HSDPA, and includes aWibro system, a WLAN system, S-DMB, and an internet network. Also, the personal life management server (120) manages the personal information received from a user terminal through a mobile communications network, and the personal life application server (130) receives the personal information from the personal life management server (120) and provides an application service to the user terminal (100).

SUMMARY OF THE INVENTION

The personal life management system, composed as described above, has the defect of requiring individuals to access a server and register individually using a user terminal, and to work one by one using the user terminal. Therefore, in order to solve the defect of the prior art, the personal on-line recording management system by using network and method thereof of the present disclosure is designed to verify the content of information in a smart terminal and store it in a management server by taking access using a user's iris information on the smart terminal, using the voice information and recording functionality included in the smart terminal to record the user's demands using the user's voice or to store the information after converting to text, and storing the information to the management server after verifying or modifying the information by displaying it again; and to transmit social media messages exchanged between smart terminals from a smart terminal to the management server for personal storage and management.

According to an aspect of the present disclosure, there is provided: a user terminal registering an ID of a user of the personal on-line recording management system by using network in a management server, registering an iris information transmitted after photographing the user in the management server as a password, accessing the network after verifying the iris information received from an iris sensor on a user terminal, recording a voice information of major contents of daily life talked about by the user, converting the voice information into text, storing the converted text information, the recorded voice information, and a video information recording the major contents of daily life of the user to the user terminal and executing an editing process by providing the text, voice, and video information on a display unit of the user terminal, transmitting the information after editing to the management server for storage and management, and receiving and displaying the recorded voice information and/or text information and/or video information stored and managed by the management server; a predesignated designator terminal designated by the user through the user terminal and stored in advance in the management server, receiving and displaying the voice information and/or text information and/or video information recorded in the management server upon demand by the user; a management server receiving and storing an ID and iris password from the user terminal, storing and managing the recorded voice information, the converted text information, and the video information of the user corresponding to the relevant ID by individual, time, and day, and transmitting the recorded voice information and/or text information and/or video information stored by individual, time, and day to a predesignated designator terminal upon demand by the user through the user terminal; and an internet network or wireless communications network connecting a large number of user terminals, designator terminals, and the management server through a network.

According to another aspect of the present disclosure, there is provided a method of personal on-line recording and management by using network, comprising: a user accessing a management server using a user terminal; the user storing an iris information on the user terminal; the user registering and storing an ID, iris information, number information, and phone number of a predesignated designator terminal on the management server using the user terminal; comparing and verifying the iris information received from an iris sensor attached to the user terminal with the iris information stored on the user terminal; transmitting the ID and iris information input into the user terminal to the management server in the case in which the user is verified; the management server comparing and verifying the ID and iris information with the stored ID and iris information; the management server transmitting the verification result to the user terminal; the user terminal receiving the user's congratulatory message or major contents of daily life in the form of story through a microphone or receiving video information about the major contents of daily life recorded by a camera attached to the terminal; the user terminal recording the user's story received through the microphone and converting the voice information of the story into text information; storing the recorded voice information, the converted text information, and the video information to the user terminal along with time information; the user terminal providing the stored text information, voice information, and video information through a display unit for the user to modify or edit; the user terminal transmitting the text information, voice information, and video information finalized after editing or modifying to the management server; the management server matching the received recorded voice information, text information, and video information with the ID or the user terminal number information for storage and management by individual, day, time, and topic; the user requesting through the user terminal the transmission of the recorded voice information and/or text information and/or video information stored and managed by individual, day, and time to the appropriate designator terminal; the management server transmitting the recorded voice information and/or text information and/or video information requested by the user to the appropriate designator terminal; and the designated and registered designator terminal displaying the received recorded voice information and/or text information and/or video information.

Advantageous Effects

The personal on-line recording management system by using network and method thereof, composed as described above, stores and manages the voice information, text information, and social media messages provided by individuals, having the effect of ordinary persons, senior citizens, or infirm persons being able to store and manage stories they would like to tell. Also, the present disclosure allows access to, stores, and manages the personal history or mutually exchanged messages of ordinary persons, senior citizens, or infirm persons through an iris verification, having the effect of resolving the concern of forgery. Another effect of the present disclosure is that users can transmit recorded voice information, text information, and video information to a designator terminal, designated and registered in advance, to indirectly receive the users' recorded information. Another effect of the present disclosure is that by transmitting the video information, voice information, and text information to the management server after editing or modifying in the terminal phase, unnecessary creation of data or communications traffic is prevented.

DETAILED DESCRIPTION OF THE INVENTION

The personal on-line recording management system by using network and method thereof of the present disclosure, having the purpose as described above, can be described as follows based on FIGS. 2 to 5.

Figure 1:
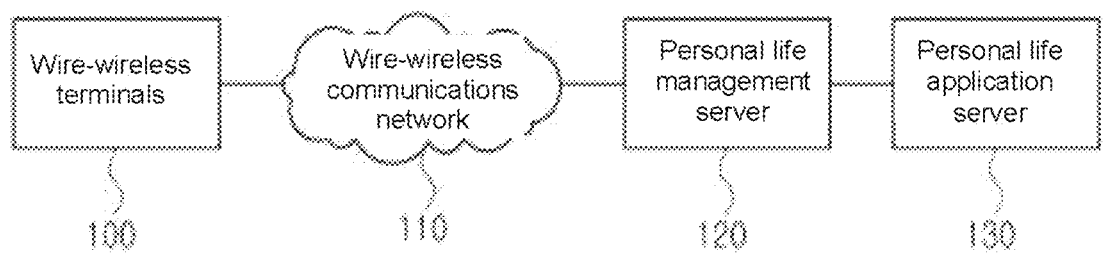
FIG. 1 is a block diagram illustrating a conventional personal life management system.
Figure 2:
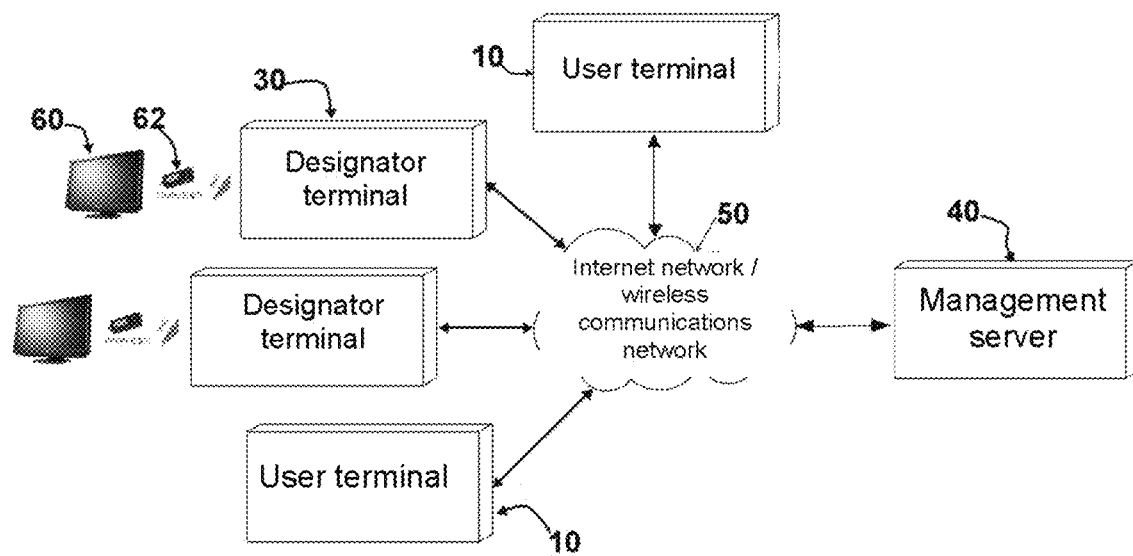
FIG. 2 is a whole block diagram of a personal on-line recording management system by using network according to a first embodiment of the invention.

FIG. 2 is a whole block diagram of a second embodiment of the personal on-line recording management system by using network of the present disclosure. In FIG. 2, the first embodiment of the personal on-line recording management system by using network is composed of a user terminal (10) registering an ID of a user in a management server, registering an iris information transmitted after photographing the user in the management server as a password, accessing the network after verifying the iris information received from an iris sensor on a user terminal, recording a voice information of major contents of daily life talked about by the user, converting the voice information into text, storing the converted text information, the recorded voice information, and a video information recording the major contents of daily life of the user to the user terminal and executing an editing process by providing the text, voice, and video information on a display unit of the user terminal, transmitting the information after editing to the management server for storage and management, and receiving and displaying the recorded voice information and/or text information and/or video information stored and managed by the management server; a predesignated designator (30) terminal designated by the user through the user terminal and stored in advance in the management server, receiving and displaying the voice information and/or text information and/or video information recorded in the management server upon demand by the user; a management server (40) receiving and storing an ID and iris password from the user terminal, verifying the ID and iris information, storing and managing the recorded voice information, the converted text information, and the video information of the user corresponding to the relevant ID by individual, time, and day, and transmitting the recorded voice information and/or text information and/or video information stored by individual, time, and day to a predesignated designator terminal upon demand by the user through the user terminal; and an internet network or wireless communications network (50) connecting a large number of user terminals, designator terminals, and the management server through a network. Also, the designator terminal may be additionally composed including a WiFi module, transmitting and providing the text information, voice information, and video information to a general TV (60) with a WiFi display module (62) attached thereto.

Figure 3:
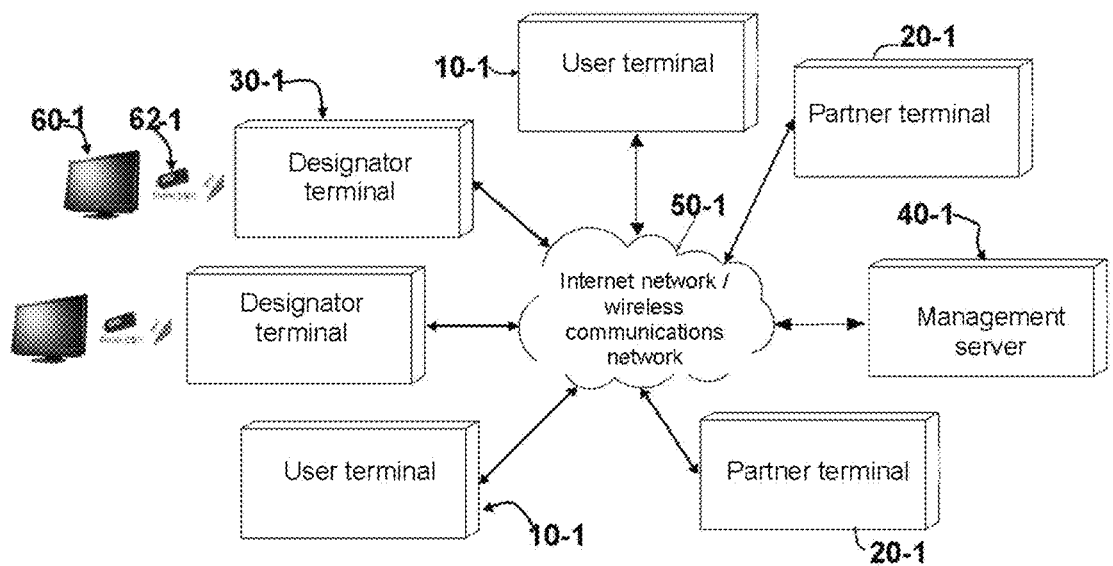
FIG. 3 is a whole block diagram of a personal on-line recording management system by using network according to a second embodiment of the invention.

FIG. 3 is a whole block diagram of a second embodiment of the personal on-line recording management system by using network of the present disclosure. In FIG. 3, the second embodiment of the personal on-line recording management system by using network is composed of a user terminal (10-1) registering an ID of a user in a management server, registering an iris information of the user in the management server as a password, accessing the network after verifying the iris information received from an iris sensor on the user terminal, storing the message information exchanged between the user terminal and a partner terminal to the user terminal, transmitting the stored message information to the management server and requesting information on whether to store the information to the partner terminal, storing and managing the exchanged message information to the management server if the partner terminal expresses a consent, and receiving and displaying the message information stored and managed by the management server; a partner terminal (20-1) exchanging messages with the user terminal through KakaoTalk or Facebook, and replying to the user terminal whether to consent to a request for the user terminal to store and manage the message information in a separate management server; a predesignated designator terminal (30-1) designated by the user through the user terminal and stored in advance in the management server, receiving and displaying the message information from the management server upon demand by the user; a management server (40-1) receiving and storing an ID and iris password from the user terminal, verifying the ID and iris information, storing and managing the message information received from the user terminal by individual, day, and time, and transmitting the stored message information of the user to a predesignated designator terminal upon demand by the user through the user terminal; and an internet network or wireless communications network (50-1) connecting a large number of user terminals, partner terminals, designator terminals, and the management server through a network. Also, the designator terminal may be additionally composed including a WiFi module, transmitting and providing text information, voice information, and video information to a general TV (60-1) with a WiFi display module (62-1) attached thereto.

Figure 4:
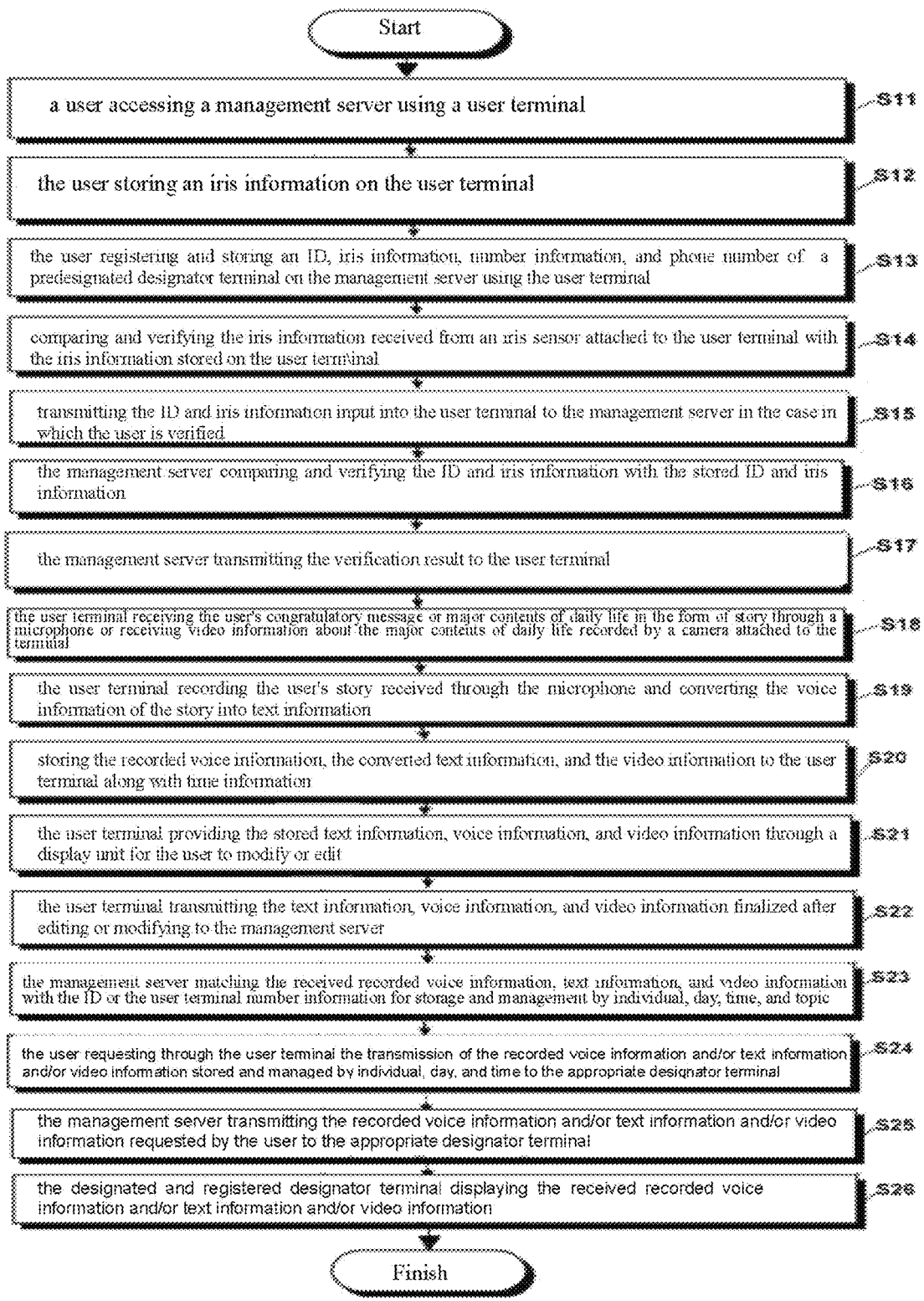
FIG. 4 is a control flow diagram of the personal on-line recording management system by using network according to the first embodiment of the invention.

FIG. 4 is a flow control diagram of the first embodiment of the method of personal on-line recording management by using network. In FIG. 4, the first embodiment of the method of personal on-line recording management by using network is composed of: a user accessing a management server using a user terminal (S11); the user storing an iris information on the user terminal (S12); the user registering and storing an ID, iris information, number information, and phone number of a predesignated designator terminal on the management server using the user terminal (S13); comparing and verifying the iris information received from an iris sensor attached to the user terminal with the iris information stored on the user terminal (S14); transmitting the ID and iris information input into the user terminal to the management server in the case in which the user is verified (S15); the management server comparing and verifying the ID and iris information with the stored ID and iris information (S16); the management server transmitting the verification result to the user terminal (S17); the user terminal receiving the user's congratulatory message or major contents of daily life in the form of story through a microphone or receiving video information about the major contents of daily life recorded by a camera attached to the terminal (S18); the user terminal recording the user's story received through the microphone and converting the voice information of the story into text information (S19); storing the recorded voice information, the converted text information, and the video information to the user terminal along with time information (S20); the user terminal providing the stored text information, voice information, and video information through a display unit for the user to modify or edit (S21); the user terminal transmitting the text information, voice information, and video information finalized after editing or modifying to the management server (S22); the management server matching the received recorded voice information, text information, and video information with the ID or the user terminal number information for storage and management by individual, day, time, and topic (S23); the user requesting through the user terminal the transmission of the recorded voice information and/or text information and/or video information stored and managed by individual, day, and time to the appropriate designator terminal (S24); the management server transmitting the recorded voice information and/or text information and/or video information requested by the user to the appropriate designator terminal (S25); and the designated and registered designator terminal displaying the received recorded voice information and/or text information and/or video information (S26). Also, the method is terminated if verification fails at steps S14 or S16. If, at step S24, the number information of a smart terminal designated and registered in advance does not exist, a new number information of a smart terminal may be designated, registered, and stored. Also, the information requested for transmission by the user at step S24 may be personal information, which may be daily information or information from a certain time period among the personal information. At step S14, deletion of the stored iris information may be disabled in preparation for the case in which the user terminal is lost, or to prevent use by a stranger, and the deletion of the stored iris information may be enabled if a password is required and the input password matches the stored password. Also, the first embodiment of the method of personal on-line recording management may be additionally composed including a step of transmitting the text information, voice information, and video information stored in the designator terminal to a general TV using a WiFi communication to provide the information through a display unit, after step S26.

Figure 5:
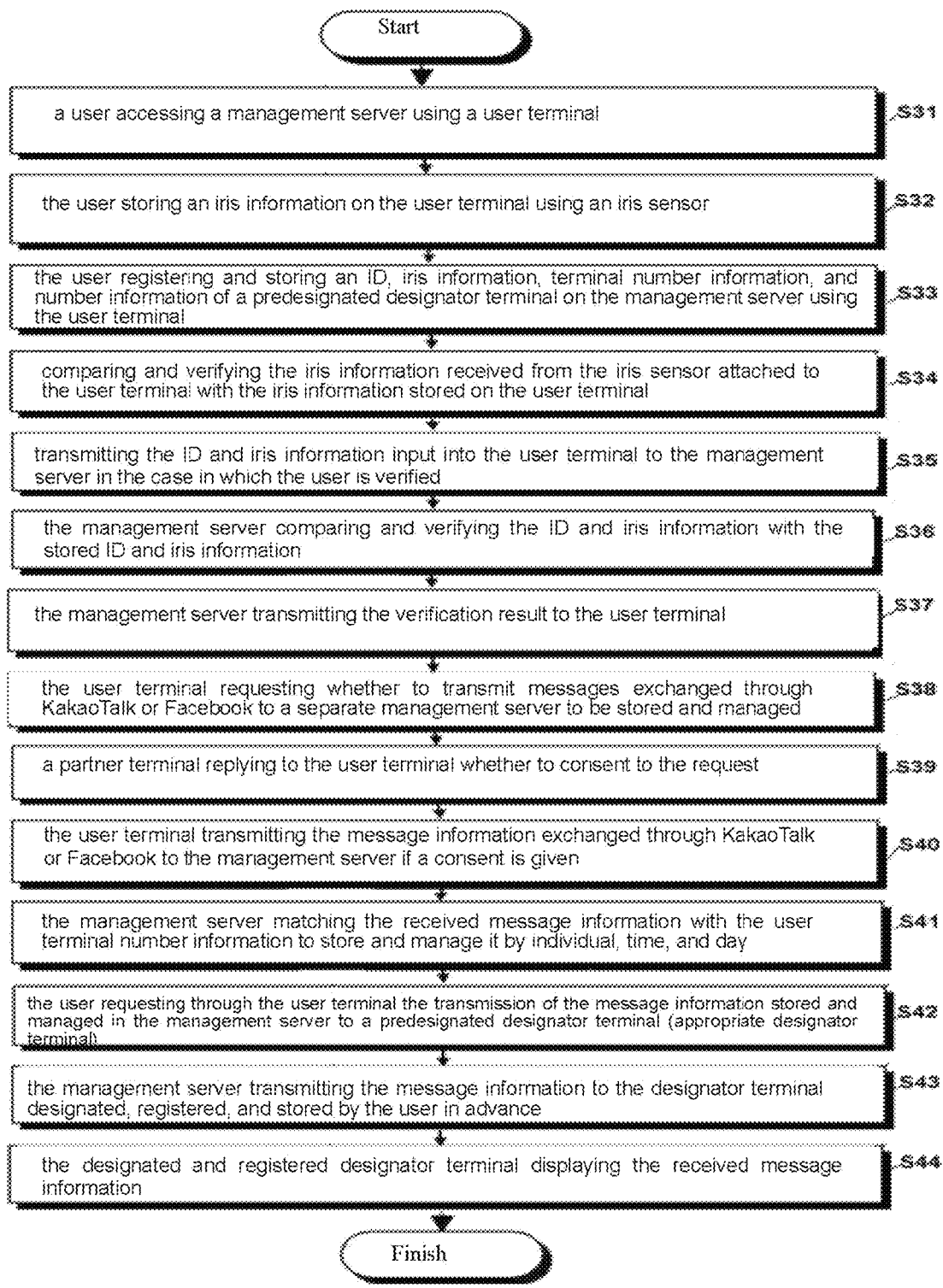
FIG. 5 is a control flow diagram of the personal on-line recording management system by using network according to the second embodiment of the invention.

FIG. 5 is a control flow diagram of the second embodiment of the method of personal on-line recording management by using network. In FIG. 5, the second embodiment of the method of personal on-line recording management by using network is composed of: a user accessing a management server using a user terminal (S31); the user storing an iris information on the user terminal using an iris sensor (S32); the user registering and storing an ID, iris information, terminal number information, and number information of a predesignated designator terminal on the management server using the user terminal (S33); comparing and verifying the iris information received from the iris sensor attached to the user terminal with the iris information stored on the user terminal (S34); transmitting the ID and iris information input into the user terminal to the management server in the case in which the user is verified (S35); the management server comparing and verifying the ID and iris information with the stored ID and iris information (S36); the management server transmitting the verification result to the user terminal (S37); the user terminal requesting whether to transmit messages exchanged through KakaoTalk or Facebook to a separate management server to be stored and managed (S38); a partner terminal replying to the user terminal whether to consent to the request (S39); the user terminal transmitting the message information exchanged through KakaoTalk or Facebook to the management server if a consent is given (S40); the management server matching the received message information with the user terminal number information to store and manage it by individual, time, and day (S41); the user requesting through the user terminal the transmission of the message information stored and managed in the management server to a predesignated designator terminal (appropriate designator terminal) (S42); the management server transmitting the message information to the designator terminal designated, registered, and stored by the user in advance (S43); and the designated and registered designator terminal displaying the received message information (S44). Also, the message information requested by the user at step S42 may be personal messages, which may be messages exchanged in a certain time period. The message information may be message information exchanged through KakaoTalk or Facebook, and the message information may include video information and voice information transmitted through KakaoTalk or Facebook. The method is terminated if verification fails at steps S34 or S36, and if the partner terminal does not give consent. The consent of step S39 may be a one-time consent, and a request for whether to give consent may be sent periodically for modification is necessary. Also, the second embodiment of the method of personal on-line recording management through input of voice information may be additionally composed including a step of transmitting information to a general TV using a WiFi communication to provide the information through a display unit, after step S44.

The personal on-line recording management system, through the network invention comprised as above, and the personal online recording management method using this system, allows the management of saving and editing of one's diary, events, etc., at the server online. By converting the note-based personal recording management to server-based integrated management system, it allows the user to save and manage all of his/her records, and hence a new business related to this system can be created in the future.

What is claimed is:

1. A personal on-line recording management system by using network, comprising:
    a user terminal (10-1) registering an ID (identification) of a user in a first management server, registering iris information of the user in the first management server as a password, accessing the network after verifying the iris information received from an iris sensor on the user terminal, storing message information exchanged between the user terminal and a partner terminal to the user terminal, transmitting the stored message information to the first management server and requesting information on whether to store the information to the partner terminal, storing and managing the exchanged message information to the first management server if the partner terminal expresses a consent, and receiving and displaying the message information stored and managed by the first management server;
    the partner terminal (20-1) exchanging messages with the user terminal through social media services, and replying to the user terminal whether to consent to a request for the user terminal to store and manage the message information in a separate management server;
    at least one predesignated designator terminal (30-1) designated by the user through the user terminal and stored in advance in the first management server, receiving and displaying the message information from the first management server upon demand by the user;
    the first management server (40-1) receiving and storing the ID and iris password from the user terminal, verifying the ID and iris information, storing and managing the message information received from the user terminal by individual, day, and time, and transmitting the stored message information of the user to the at least one predesignated designator terminal upon demand by the user through the user terminal; and
    an internet network or wireless communications network (50-1) connecting a large number of user terminals, partner terminals, designator terminals, and the first management server through a network.

2. The personal on-line recording management system by using network according to claim 1, wherein an additional composition includes a general TV (6) with a WiFi module attached thereto, communicating with the at least one designator terminal via WiFi and providing text information, voice information, and video information.

3. A method of personal on-line recording management by using network, the method comprising:
    a user accessing a first management server using a user terminal (S31);
    the user storing iris information on the user terminal using an iris sensor (S32);
    the user registering and storing an ID (identification), the iris information, number information of the user terminal, and number information of at least one predesignated designator terminal on the first management server using the user terminal (S33);
    when a person attempts to access the first management server using the user terminal, comparing and verifying iris information of the accessing person received from the iris sensor attached to the user terminal with the iris information stored on the user terminal to verify whether or not the accessing person is the user (S34);
    transmitting the ID and iris information input into the user terminal to the first management server in the case in which the user is verified (S35);
    the first management server comparing and verifying the ID and iris information with the stored ID and iris information (S36);
    the first management server transmitting the verification result to the user terminal (S37);
    the user terminal requesting whether to transmit messages exchanged through social media services to a separate management server to be stored and managed (S38);
    a partner terminal replying to the user terminal whether to consent to the request (S39);
    the user terminal transmitting the message information exchanged through social media services to the separate management server if a consent is given (S40);
    the first management server matching received message information with the number information of the user terminal to store and manage it by individual, time, and day (S41);
    the user requesting through the user terminal transmission of the message information stored and managed in the first management server to the at least one predesignated designator terminal (appropriate designator terminal) (S42);
    the first management server transmitting the message information to the at least one designator terminal designated, registered, and stored by the user in advance (S43); and
    the at least one designated and registered designator terminal displaying the received message information (S44).

4. The method of claim 3, further comprising, after step S44, a step of transmitting information to a general TV using a WiFi communication to provide the information through a display unit.

* * * * *